United States Patent
Wagner et al.

(10) Patent No.: US 8,074,757 B2
(45) Date of Patent: Dec. 13, 2011

(54) PROTECTIVE HOUSING FOR A VEHICLE BATTERY

(75) Inventors: Michael Wagner, Wiernsheim-Pinache (DE); Herbert Klamser, Korntal-Muenchingen (DE); Gerald Hekmann, Ludwigsburg (DE); Franz-Rudolf Wierschem, Weissach (DE); Thomas Wust, Sindelfingen (DE)

(73) Assignee: Dr. Ing. h.c.f. Porsche Aktiengesellschaft (DE)

( * ) Notice: Subject to any disclaimer, the term of this patent is extended or adjusted under 35 U.S.C. 154(b) by 720 days.

(21) Appl. No.: 12/121,380

(22) Filed: May 15, 2008

(65) Prior Publication Data

US 2008/0283318 A1 Nov. 20, 2008

(30) Foreign Application Priority Data

May 18, 2007 (DE) .......................... 10 2007 023 392

(51) Int. Cl.
*B60K 1/04* (2006.01)
*B60R 16/04* (2006.01)
(52) U.S. Cl. ...................................... 180/68.5; 903/952
(58) Field of Classification Search ................. 180/65.1, 180/68.5; 903/951, 952
See application file for complete search history.

(56) References Cited

U.S. PATENT DOCUMENTS

| | | | | |
|---|---|---|---|---|
| 1,875,627 A | * | 9/1932 | Mancha et al. | 105/51 |
| 4,365,681 A | * | 12/1982 | Singh | 180/68.5 |
| 5,390,754 A | * | 2/1995 | Masuyama et al. | 180/68.5 |
| 7,201,433 B2 | * | 4/2007 | Herntier et al. | 296/187.03 |
| 2005/0173170 A1 | * | 8/2005 | Miyajima et al. | 180/68.5 |
| 2007/0215399 A1 | | 9/2007 | Watanabe et al. | |
| 2008/0196957 A1 | * | 8/2008 | Koike et al. | 180/68.5 |

FOREIGN PATENT DOCUMENTS

| | | |
|---|---|---|
| DE | 102 61 630 A1 | 7/2004 |
| DE | 11 2005 000 492 T5 | 4/2007 |
| EP | 1 182 093 B1 | 2/2002 |
| GB | 2 108 443 * | 5/1983 |
| JP | 5-16674 * | 1/1993 |
| JP | 5-246252 * | 9/1993 |

* cited by examiner

*Primary Examiner* — Frank Vanaman
(74) *Attorney, Agent, or Firm* — Gerald E. Hespos; Michael J. Porco

(57) ABSTRACT

A protective housing for a battery in a motor vehicle includes two transverse walls and two longitudinal walls, which together form a lateral enclosure for a battery receptacle chamber. The protective housing is fastened to at least one longitudinal girder of the vehicle in the installed state in an installation chamber of the vehicle. The transverse walls and the longitudinal walls are each formed by separate components, which are assembled into the enclosure. The installation chamber is located between two longitudinal girders of the vehicle chamber, and the enclosure is fastened to both longitudinal girders.

14 Claims, 1 Drawing Sheet

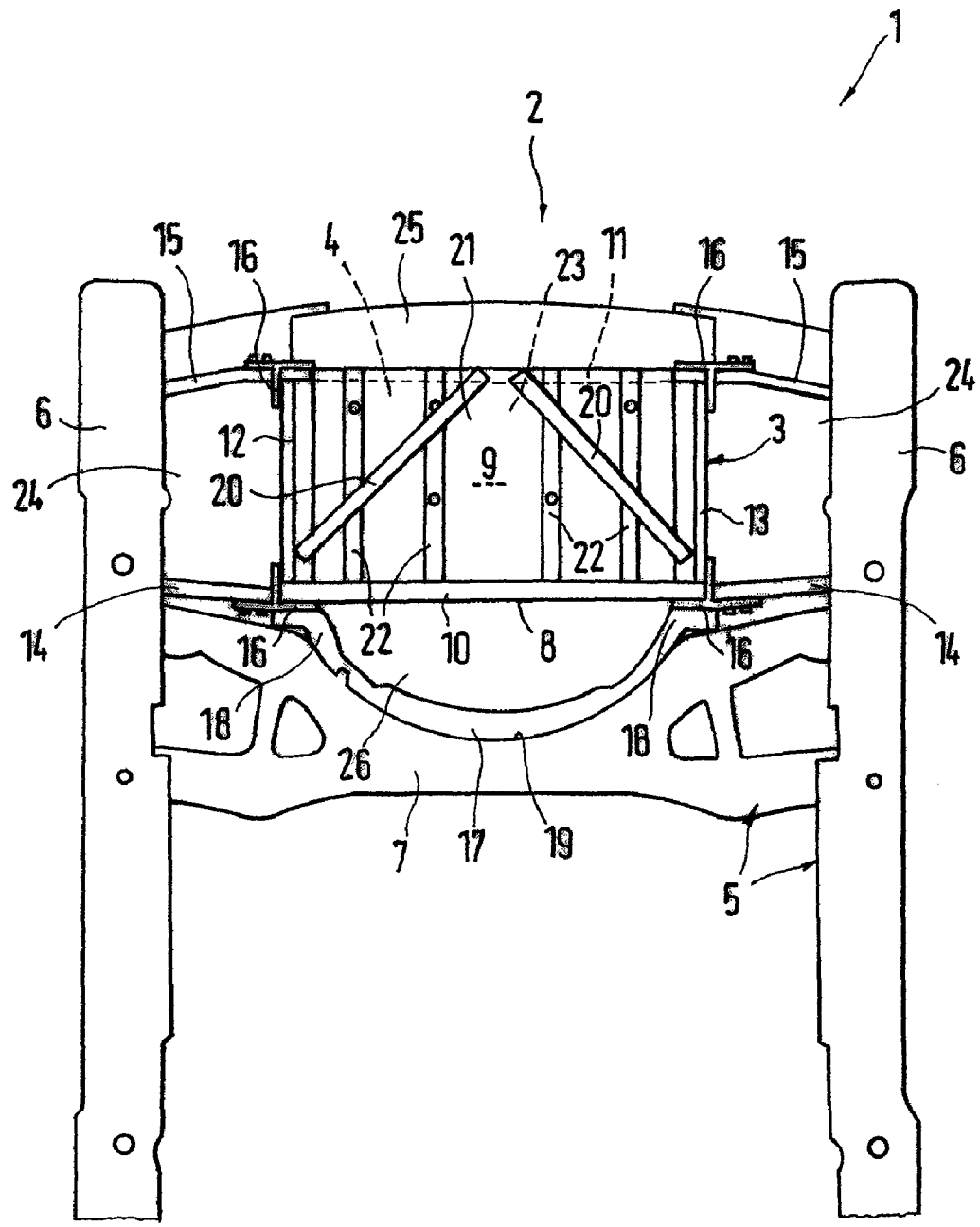

PROTECTIVE HOUSING FOR A VEHICLE BATTERY

CROSS-REFERENCE TO RELATED APPLICATION

This application claims the priority of German Application No. 10 2007 023 392.4, filed May 18, 2007, the disclosure of which is expressly incorporated by reference herein.

This application is related to co-pending U.S. application Ser. No. 12/121,372, filed on even date herewith, and entitled "Protective Housing For A Vehicle Battery".

BACKGROUND AND SUMMARY OF THE INVENTION

The invention relates to a protective housing for a battery in a motor vehicle, having two transverse walls and two longitudinal walls, which together form a lateral enclosure for a battery receptacle chamber. The protective housing is fastened to at least one longitudinal girder of the vehicle in the installed state in an installation chamber of the vehicle. The invention additionally relates to a motor vehicle equipped with a protective housing of this type.

A protective housing for a battery in a motor vehicle is known from EP 1 182 093 B1, which housing has two transverse walls and two longitudinal walls, which together form a lateral enclosure for a battery receptacle chamber. The protective housing is fastened to a longitudinal girder of the motor vehicle in an installation chamber of the vehicle in the installed state. The known protective housing is the installation chamber around the engine compartment in which the engine of the vehicle is located. To reduce the danger of damage to the battery in the event of a collision, a platform on which the protective housing is situated, and via which the protective housing is fastened to the longitudinal girder, is provided with two ramps which contribute to allowing the platform having the protective housing and the battery situated therein to slide off on two vehicle-side obstructions.

The present invention is concerned with the problem of providing an improved embodiment for a protective housing of the above-mentioned type, which is distinguished in particular by improved collision protection.

This problem is solved according to the invention by providing a protective housing for a battery of a motor vehicle having two transverse walls and two longitudinal walls, which together form a lateral enclosure for a battery receptacle chamber. The transverse walls and the longitudinal walls are each formed as a separate component, which are assembled into the enclosure. The installation chamber is located between two longitudinal girders of the vehicle. The enclosure is fastened to both longitudinal girders. Advantageous embodiments are described and claimed herein.

The invention is based on the general idea of selecting the installation chamber for housing the protective housing between two longitudinal girders of the vehicle and fastening the enclosure to both longitudinal girders. Furthermore, it is suggested that the enclosure be constructed from the transverse walls and the longitudinal walls together, which are each implemented as separate components for this purpose. A protective housing may be provided by this construction whose enclosure has an increased rigidity and may be fixed in the installation chamber with increased stability. In particular, the attachment of the enclosure to two longitudinal girders allows improved absorption of forces, which may arise in case of a crash.

In addition, in an advantageous embodiment, the protective housing may additionally be supported on a cross member, which connects the two longitudinal girders to one another. The support of forces in case of a crash may be significantly improved by this measure.

A further improvement of the absorption of forces arising in case of a crash may be achieved in a refinement in that a curved support girder is provided, which is fastened on its ends to the enclosure and is supported on the cross member between its ends. A curved support girder of this type acts like an arch and may absorb relatively large forces with a relatively light construction.

It is obvious that the features cited above and to be explained hereafter are usable not only in the particular specified combination, but rather also in other combinations or alone without leaving the scope of the present invention.

Other objects, advantages and novel features of the present invention will become apparent from the following detailed description when considered in conjunction with the accompanying drawing.

BRIEF DESCRIPTION OF THE DRAWING

The single FIG. 1 shows a greatly simplified, schematic top view of a vehicle (only partially shown) in the area of a protective housing.

DETAILED DESCRIPTION OF THE DRAWING

According to FIG. 1, an installation chamber 2 for receiving a protective housing 3 for a battery 4 may be implemented in a motor vehicle 1 (only partially shown here). The vehicle 1 may preferably be a hybrid vehicle, which has at least one electric motor for driving the vehicle 1 in addition to an internal combustion engine. The installation chamber 2 may be situated in a front chamber or, preferably, in a rear chamber of the vehicle 1. A rear end section of a shell structure 5 of the vehicle 1 is shown in FIG. 1. The battery 4 may be implemented as a traction battery, in particular in a hybrid vehicle 1, and thus have comparatively large dimensions.

The vehicle 1 and/or its shell 5 has two longitudinal girders 6 in the area shown, which extend essentially parallel to a vehicle longitudinal direction. The installation chamber 2 is implemented between the two longitudinal girders 6. The protective housing 3 is preferably situated essentially centrally between the two longitudinal girders 6. Furthermore, the installation chamber 2 is delimited here by a cross member 7, which connects the two longitudinal girders 6, i.e., is fastened thereto. The cross member 7 extends essentially parallel to a vehicle transverse direction, which is perpendicular to the vehicle longitudinal direction.

The protective housing 3 has an enclosure 8, which laterally encloses a chamber 9 for receiving the battery 4. The enclosure 8 is assembled from two transverse walls 10, 11 and two longitudinal walls 12, 13. The cited walls 10 through 13 are each implemented as separate components. With the positioning of the protective housing 3 in the rear of the vehicle 1 shown here, the transverse walls 10, 11 are thus a front transverse wall 10 or front wall 10 and a rear transverse wall 11 or rear wall 11. The transverse walls 10, 11 extend parallel to the vehicle transverse direction. In contrast thereto, the longitudinal walls 12, 13 extend parallel to the vehicle longitudinal direction and form side walls 12, 13 of the enclosure 8. The walls 10 through 13 are implemented to be resistant to bending and may be produced, for example, as extruded profiles, in particular made of aluminum, and with or without chambers. The individual walls 10, 13 may be fastened to one another in a suitable manner in the corner areas of the protective housing 3. For example, the walls 10, 13 are welded to one another.

The enclosure 8 is fastened to both longitudinal girders 6. Here, the enclosure 8 is attached to the longitudinal girders 6 with the aid of front support elements 14 and rear support elements 15. The support elements 14, 15 are fastened via angle elements 16 to the enclosure 8, for example, by screwing and/or welding. For example, the angle elements 16 are welded to the enclosure 8 and screwed onto the support elements 14, 15. The support elements 14, 15 are fastened in a suitable manner to the longitudinal girders 6, for example, by screws and/or welds. In the example shown, the enclosure 8 is attached to the two longitudinal girders 6 in that the front transverse wall 10 is fastened to both longitudinal girders 6 via the two front support elements 14 and, in addition, the rear transverse wall 11 is fastened to both longitudinal girders 6 via the two rear support elements 15.

In addition, in the embodiment shown here, the protective housing 3 is supported on the cross member 7. For this purpose, a support girder 17 is provided, which has a curved form in the view shown. The support girder 17 is fastened at its ends 18 to the enclosure 8, for example, via the angle elements 16. Between its ends 18, the support girder 17 may come to rest on the cross member 7. The cross member 7 expediently has a concave contour 19 on its side facing toward the installation chamber 2, along which the contact between support girder 17 and cross member 7 may occur. Optionally, the support girder 17 may be fastened to the cross member 7, for example, by spot welds or screws.

A least one diagonal strut 20 may be provided for stiffening the enclosure 8. In the example, two diagonal struts 20 are indicated. Each diagonal strut 20 is supported and/or fastened on one end in the middle area of one transverse wall 10, 11 (the rear wall 11 here), and on the other end in a corner area, in which the other transverse wall 10, 11 (i.e., here the front wall 10), is connected to the particular longitudinal wall 12 or 13, respectively.

Further stiffening of the protective housing 3 may be implemented with the aid of a cover 21, which delimits the battery receptacle chamber 9 on top and is designed as a support, which supports the two transverse walls 10, 11 in the longitudinal direction of the vehicle 1 on one another in the mounted state. One or more longitudinal struts 22 may be provided to stiffen this cover 21. These longitudinal struts 22 may improve and/or implement the longitudinal support of the two transverse walls 10, 11 on one another.

Fundamentally, the protective housing 3 may also be provided with a floor 23, concealed here, which delimits the battery receptacle chamber 9 on the bottom. This floor 23 may also be designed as a support, which supports the two transverse walls 10, 11 on one another in the longitudinal direction of the vehicle 1. The floor 23 may also be equipped with one or more longitudinal struts 22 to implement the desired longitudinal support of the transverse walls 10, 11 and/or stiffen the floor 23. Like the cover 21, the floor 23 may be produced as an extruded profile, in particular made of aluminum.

In addition, the floor 23 may be connected via side sections 24 to the longitudinal girders 6. Furthermore, the floor 23 may have a rear longitudinal section 25, which lengthens the floor 23 to the rear beyond the protective housing 3. Additionally or alternatively, a front longitudinal section 26 may be provided, which projects forward beyond the protective housing 3. This front longitudinal section 26 may be fastened from below to the support girder 17. The support girder 17 may be additionally stiffened in this manner.

The diagonal struts 20 may be situated in the area of the cover 21 or positioned indirectly on the cover 21. Additionally or alternatively, the diagonal struts 20 may be situated in the area of the floor 23 or attached to the floor 23.

In case of a crash, the rear area of the vehicle 1 is impinged by longitudinal forces oriented forward. These forces may be absorbed by the rear wall 11 and partially transmitted via the rear support elements 15 into the longitudinal girders 6. Moreover, the longitudinal forces are transmitted via the longitudinal walls 12, 13 and—if provided—via the diagonal struts 20 and possibly via the cover 21 and/or the floor 23 to the front wall 10. The longitudinal forces are partially transmitted from the front wall 10 via the front support elements 14 to the longitudinal girders 6 again and also via the support girder 17 to the cross member 7. The cross member 7, in turn, transmits the forces back into the longitudinal girders 6. In the most favorable case, the longitudinal forces occurring in case of a crash are directed around the battery receptacle chamber 9, without intrusion into the battery receptacle chamber 9, so as to prevent damage to the battery 4.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A protective housing for a battery in a motor vehicle, comprising:
   first and second longitudinal girders extending in a longitudinal direction of the motor vehicle;
   a cross member extending transversely between the longitudinal girders and having opposite ends connected respectively to the longitudinal girders;
   a curved support girder having a convex side supported on the cross member at a position spaced from the longitudinal girders, the curved support girder further having a concave side opposite the convex side;
   an enclosure for laterally enclosing a battery receptacle chamber for the battery, the enclosure comprising two transverse walls aligned transverse to the longitudinal girders, one of the transverse walls having opposite ends connected to spaced apart positions on the curved support girder and facing the concave side of the curved support girder and two longitudinal walls extending between and connecting the transverse walls, the transverse walls and the longitudinal walls being formed of separate components, assembled into the enclosure; and
   two front support elements fastening a front one of the two transverse walls of the enclosure to the first and second longitudinal girders of the vehicle and two rear support elements fastening a rear one of the two transverse walls to the first and second longitudinal girders.

2. The protective housing according to claim 1 further comprising at least one diagonal strut for stiffening the enclosure, the at least one diagonal strut being secured on one end in a middle area of one transverse wall and at another end in a corner area where in the other transverse wall is connected to one of the two longitudinal walls.

3. The protective housing according to claim 2, further comprising a floor delimiting the battery receptacle chamber on a bottom thereof, the floor being operatively configured to support the two transverse walls in a longitudinal direction.

4. The protective housing according to claim 3, further comprising a cover delimiting a top for the battery receptacle chamber, the cover being operatively configured to support the two transverse walls in a longitudinal direction.

5. The protective housing according to claim 4, wherein at least one of the floor and the cover comprises at least one longitudinal strut operatively configured to support at least one of the two transverse walls on one another and stiffen the floor and/or the cover.

6. The detective housing according to claim 4, wherein at least one of the floor and the cover have and extruded profile.

7. The protective housing according to claim 6, wherein at least one of the transverse walls and the longitudinal walls have extruded profiles.

8. The protective housing according to claim 1, further comprising a floor delimiting the battery receptacle chamber on a bottom thereof, the floor being operatively configured to support the two transverse walls in a longitudinal direction.

9. The protective housing according to claim 1, further comprising a cover delimiting a top for the battery receptacle chamber, the cover being operatively configured to support the two transverse walls in a longitudinal direction.

10. The protective housing according to claim 1, wherein at least one of the transverse walls and the longitudinal walls have extruded profiles.

11. The protective housing according to claim 1, wherein the battery receptacle chamber is arranged in a rear area of the vehicle.

12. A motor vehicle having a battery, comprising:
   first and second longitudinal girders extending in a longitudinal direction of the motor vehicle;
   a cross member extending transversely between the longitudinal girders and having opposite ends connected respectively to the longitudinal girders;
   a curved support girder having a convex side supported on the cross member at a position spaced from the longitudinal girders, the curved support girder further having a concave side opposite the convex side;
   a protective housing for the battery, the protective housing comprising an enclosure for laterally enclosing a battery receptacle chamber for the battery, the enclosure comprising two transverse walls aligned transverse to the longitudinal girders, one of the transverse walls having opposite ends connected to spaced apart positions on the curved support girder and facing the concave side of the curved support girder and two longitudinal walls extending between and connecting the transverse walls, the transverse walls and the longitudinal walls being formed of separate components, assembled into the enclosure; and
   two first support elements extending from the enclosure and being fastened to the first longitudinal girders of the vehicle and two second support elements extending from the enclosure and being fastened to the second longitudinal girder of the vehicle.

13. The motor vehicle according to claim 12, further comprising at least one diagonal strut for stiffening the enclosure, the at least one diagonal strut being secured on one end in a middle area of one transverse wall and at another end in a corner area wherein the other transverse wall is connected to one of the two longitudinal walls.

14. The motor vehicle according to claim 12, further comprising a cover delimiting a top for the battery receptacle chamber, the cover being operatively configured to support the two transverse walls in a longitudinal direction.

* * * * *